United States Patent
Lee et al.

(10) Patent No.: US 12,420,303 B2
(45) Date of Patent: Sep. 23, 2025

(54) DUAL SLOT DIE COATER AND METHOD FOR COATING ELECTRODE ACTIVE MATERIAL SLURRY USING THE SAME

(71) Applicant: LG Energy Solution, Ltd., Seoul (KR)

(72) Inventors: Taek-Soo Lee, Daejeon (KR);
Min-Kyu Kang, Daejeon (KR);
Young-Gon Kim, Daejeon (KR);
Shin-Wook Jeon, Daejeon (KR);
Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 212 days.

(21) Appl. No.: 17/922,164

(22) PCT Filed: Sep. 17, 2021

(86) PCT No.: PCT/KR2021/012842
§ 371 (c)(1),
(2) Date: Sep. 26, 2023

(87) PCT Pub. No.: WO2022/060177
PCT Pub. Date: Mar. 24, 2022

(65) Prior Publication Data
US 2024/0050975 A1  Feb. 15, 2024

(30) Foreign Application Priority Data
Sep. 17, 2020  (KR) .......................... 10-2020-0119919

(51) Int. Cl.
*B05C 5/02* (2006.01)
*B05C 9/06* (2006.01)
(Continued)

(52) U.S. Cl.
CPC .............. *B05C 5/0254* (2013.01); *B05C 9/06* (2013.01); *H01M 4/0404* (2013.01);
(Continued)

(58) Field of Classification Search
None
See application file for complete search history.

(56) References Cited

U.S. PATENT DOCUMENTS 5,256,357 A * 10/1993 Hayward ................ B29C 48/08
264/172.19
5,597,615 A     1/1997 Tsunoda et al.
(Continued)

FOREIGN PATENT DOCUMENTS

EP     0572329 B1    7/1997
JP     2003260400 A  9/2003
(Continued)

OTHER PUBLICATIONS

International Search Report for Application No. PCT/KR2021/012842 mailed Jan. 10, 2022, 2 pages.
(Continued)

*Primary Examiner* — Binu Thomas
(74) *Attorney, Agent, or Firm* — Lerner David LLP (57) ABSTRACT

A dual slot die coater including a lower slot and an upper slot, for extrusion coating of an electrode active material slurry on a surface of a continuously moving current collector. The dual slot die coater includes a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming an front end with respect to the current collector, respectively, and a thickness of the lower die lip is larger than a thickness of the upper die lip and a thickness of the intermediate die lip.

16 Claims, 7 Drawing Sheets

(51) Int. Cl.
*H01M 4/04* (2006.01)
*H01M 10/04* (2006.01)
*H01M 4/02* (2006.01)

(52) U.S. Cl.
CPC .... *H01M 4/0411* (2013.01); *H01M 2004/021* (2013.01); *H01M 10/0404* (2013.01)

(56) References Cited

U.S. PATENT DOCUMENTS

| | | | | |
|---|---|---|---|---|
| 5,962,075 | A | * 10/1999 | Sartor | B05C 5/0254 118/411 |
| 6,139,639 | A | 10/2000 | Kitamura et al. | |
| 2002/0197535 | A1 | * 12/2002 | Dudley | H01M 4/0404 427/407.1 |
| 2003/0087038 | A1 | * 5/2003 | Su | B05C 5/0254 427/407.1 |
| 2004/0241327 | A1 | 12/2004 | Wyatt et al. | |
| 2013/0273253 | A1 | * 10/2013 | Kuniyasu | B05C 5/0254 118/123 |
| 2016/0016185 | A1 | 1/2016 | Park et al. | |
| 2019/0351446 | A1 | 11/2019 | Lee et al. | |
| 2020/0185696 | A1 | 6/2020 | Lee et al. | |

FOREIGN PATENT DOCUMENTS

| | | |
|---|---|---|
| JP | 2005509247 A | 4/2005 |
| JP | 2013220385 A | 10/2013 |
| KR | 0137109 B1 | 4/1998 |
| KR | 0164669 B1 | 3/1999 |
| KR | 100369571 B1 | 4/2003 |
| KR | 20060004704 A | 1/2006 |
| KR | 20160010808 A | 1/2016 |
| KR | 20190019827 A | 2/2019 |
| KR | 20190084471 A | 7/2019 |
| WO | 9724714 A1 | 7/1997 |
| WO | 2020039990 A1 | 2/2020 |

OTHER PUBLICATIONS

Extended European Search Report for Application No. 21869799.3 dated Nov. 9, 23. 10 pgs.

* cited by examiner

FIG. 1

RELATED ART

FIG. 2

RELATED ART

DUAL SLOT DIE COATER AND METHOD FOR COATING ELECTRODE ACTIVE MATERIAL SLURRY USING THE SAME

CROSS-REFERENCE TO RELATED APPLICATIONS

This application is a national phase entry under 35 U.S.C. § 371 of International Application No. PCT/KR2021/012842, filed on Sep. 17, 2021, which claims priority to Korean Patent Application No. 10-2020-0119919, filed on Sep. 17, 2020, the disclosures of which are incorporated herein by reference.

TECHNICAL FIELD

The present disclosure relates to a dual slot die coater capable of simultaneously forming a double layer structure and a method for coating an electrode active material slurry using the same.

BACKGROUND ART

With the increasing technology development and the growing demand for mobile devices, the demand for secondary batteries as an energy source is rapidly increasing, and secondary batteries essentially include an electrode assembly which is a power generation element. The electrode assembly includes a positive electrode, a separator, and a negative electrode stacked at least once, and the positive electrode and the negative electrode are manufactured by coating and drying a positive electrode active material slurry and a negative electrode active material slurry on a current collector made of an aluminum foil and a current collector made of a copper foil, respectively. In general, the secondary battery includes the positive electrode active material, for example, lithium containing cobalt oxide ($LiCoO_2$) of layered crystal structure, lithium containing manganese oxide such as $LiMnO_2$ of layered crystal structure, $LiMn_2O_4$ of spinel crystal structure, and lithium containing nickel oxide ($LiNiO_2$). Additionally, the negative electrode active material primarily includes carbon based materials, and recently, with the growing demand for high energy lithium secondary batteries, proposals have been made to mix with silicon based materials and silicon oxide based materials having effective capacity at least 10 times higher than carbon based materials. For the uniform charging/discharging characteristics of the secondary batteries, it is necessary to uniformly coat the positive electrode active material slurry and the negative electrode active material slurry on the current collector.

To improve the performance of the secondary batteries, attention is directed to the development of an electrode structure having an active material layer of double layer structure on the current collector. To form the active material layer of double layer structure on the current collector, a dual slot die coater capable of simultaneously coating two types of electrode active material slurries may be used.

Figure 1:
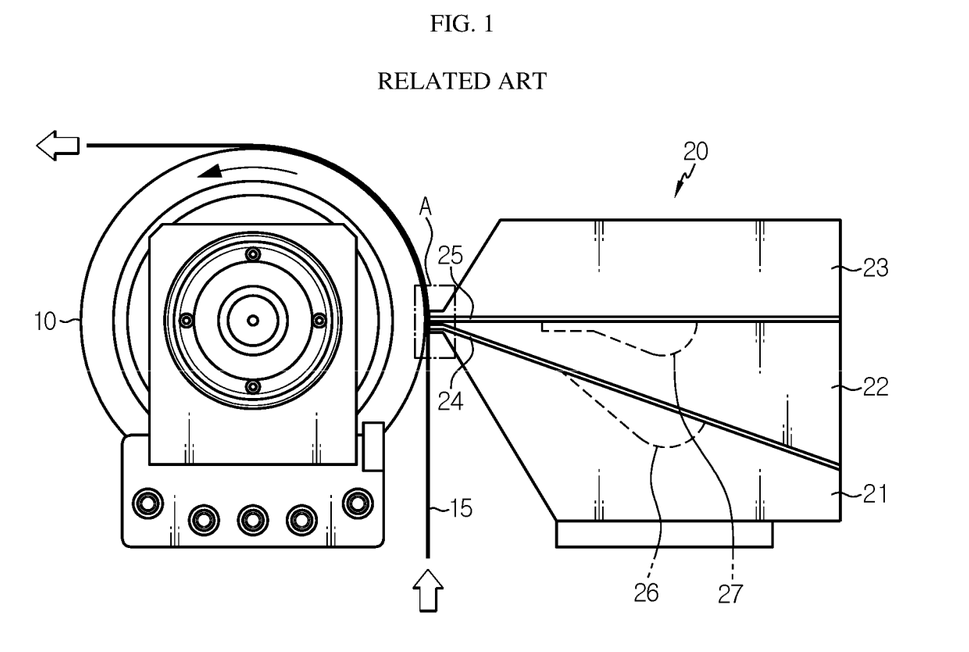
FIG. 1 is a schematic cross-sectional view of a conventional dual slot die coater.
Figure 2:
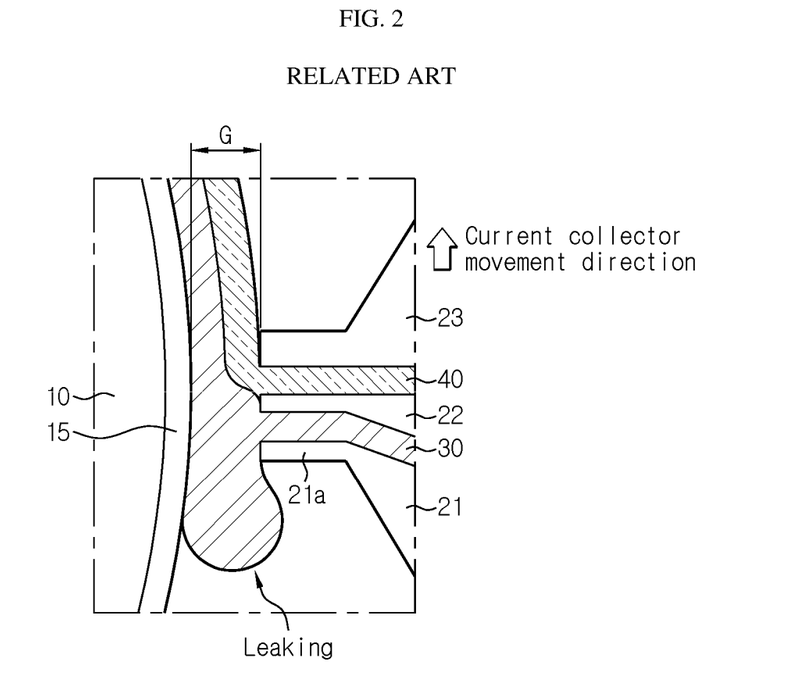
FIG. 2 is an enlarged diagram of section A in FIG. 1.

FIG. 1 shows an example of a coating method using the dual slot die coater, and FIG. 2 is an enlarged diagram of section A in FIG. 1.

Referring to FIGS. 1 and 2, an electrode active material layer may be formed in a double layer on the current collector 15 at the same time by delivering two types of electrode active material slurries 30, 40 from the dual slot die coater 20 while moving the current collector 15 by rotation of a coating roll 10. The electrode active material slurries 30, 40 delivered from the dual slot die coater 20 are coated over one surface of the current collector 15 to form the electrode active material layer.

The dual slot die coater 20 is constructed by assembling three plate members, i.e., three die blocks 21, 22, 23. A slot is formed between the adjacent die blocks, totaling two slots, to simultaneously deliver two types of electrode active material slurries 30, 40 through exit ports 24, 25, each in communication with each slot, so the first electrode active material slurry 30 is coated earlier and the additional second electrode active material slurry 40 is continuously coated on the first electrode active material slurry 50, to simultaneously form the double-layered electrode active material layer. The reference numbers 26 and 27 indicate manifolds in which a coating solution is received.

However, the process using the dual slot die coater 20 has some difficulties in forming each electrode active material layer to a desired thickness due to the use of the electrode active material slurries 30, 40 simultaneously delivered from different exit ports 24, 25.

The gap G from the exit ports 24, 25 to the surface of the current collector 15 is a coating gap, and is a very important variable in determining the coating quality of the electrode active material layer. In general, the thickness of each electrode active material layer is affected by the amount of the electrode active material slurry delivered through the exit ports 24, 25, the type of the electrode active material slurry and the coating gap. Additionally, stable coating requires a uniform coating gap in the widthwise direction (TD direction) of the current collector, and a widthwise coating gap deviation significantly affects the coating width and the uncoated region boundary shape. The thickness of the electrode active material layer is a very small value of a few tens of μm to a few hundreds of μm, and even a few μm change significantly affects the coating quality, so very strict management is required, and to stably achieve uniform coating in the widthwise direction of the current collector, it is necessary to control very strictly in order to achieve uniform dimensional precision in the widthwise direction. However, to increase the production amount, as the width of the dual slot die coater 20 increases with the increasing width of the current collector, it is more difficult to uniformly coat in the widthwise direction and precise control of the coating gap is more necessary.

Additionally, the coating process using the dual slot die coater 20 has a problem such as leaking and side ring because of simultaneously delivering the electrode active material slurries 30, 40 from different exit ports 24, 25. Among them, leaking refers to instability caused by the loss of some of the coating solution upstream outside of a die lip 21a as shown in FIG. 2. This refers to a loss of the pre-metered coating solution, which makes it impossible to estimate the final coating thickness. Due to the leaking, the coating solution may reside for a long time and turn into a solid or a widthwise coating thickness deviation may occur. In particular, when the coating solution is delivered under high pressure with the coating gap G reduced down to a few hundreds of μm to achieve thin film coating or reduce the widthwise thickness deviation of the coating layer, leaking may get severer.

When drying the electrode active material slurries 30, 40 after coating, the coating layer may change in shape due to the surface tension of a liquid component of the slurry, and thus this fact should be considered when coating. For example, the Marangoni flow takes place inwards from the edges of the coating layer during drying, and after drying, a fat-edge pattern defect may occur, resulting in fat edges. To prevent the fat-edge pattern defect, it is necessary to coat the edge thinner. When the exit ports 24, 25 are closer to the current collector 15 with the smaller coating gap G, the edge may be coated thinner. However, as the coating gap G is smaller, leaking gets severer.

A window margin exists between a leaking area and a side ring area. The wider the window margin, the higher the productivity. Since the above-mentioned coating gap G significantly affects the size and shape of coating beads formed between the current collector 15 and the die lip 21a during coating and the location of the dynamic contact line, the conventional slot coating process prevents leaking by repeatedly adjusting the initial conditions such as the coating gap, the properties of the coating solution, and the volume and rate of the flow of the coating solution. However, it is not easy to set the initial conditions and it takes a long time to find the optimal process conditions. Accordingly, the wider window margin makes it easier to control the coating gap or set the initial conditions.

DISCLOSURE

Technical Problem

The present disclosure is designed to solve the above-described problem, and therefore the present disclosure is directed to providing a dual slot die coater with high productivity by reducing the occurrence of leaking and widening the window margin and a method for coating an electrode active material slurry using the same.

However, the problems to be solved by the present disclosure are not limited to the above problems, and other problems will be clearly understood by those skilled in the art from the following detailed description.

Technical Solution

To solve the above-described problem, a dual slot die coater according to the present disclosure is a dual slot die coater comprising a lower slot and an upper slot, for extrusion coating of an electrode active material slurry on a surface of a continuously moving current collector through at least one of the lower slot or the upper slot, the dual slot die coater comprising a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming an front end with respect to the current collector, respectively, and a thickness of the lower die lip is larger than a thickness of the upper die lip and a thickness of the intermediate die lip.

In the present disclosure, the thickness of the lower die lip:the thickness of the upper die lip may be 1.2:1 or more.

In the present disclosure, the thickness of the lower die lip:the thickness of the intermediate die lip may be 1.2:1 or more.

In the present disclosure, a lower exit port in communication with the lower slot may be formed between the lower die lip and the intermediate die lip, an upper exit port in communication with the upper slot may be formed between the intermediate die lip and the upper die lip, the slurry forming a lower slurry layer may be delivered on the current collector through the lower exit port, and the slurry forming an upper slurry layer may be delivered on the lower slurry layer on the current collector through the upper exit port, the upper exit port being spaced apart from the lower exit port downstream in a coating direction.

In the present disclosure, a thinner die lip between the upper die lip and the intermediate die lip is preferably 800 µm or more in thickness.

In the present disclosure, a distance between the current collector and the upper die lip may be larger than a distance between the current collector and the lower die lip and a distance between the current collector and the intermediate die lip.

In the present disclosure, preferably, the current collector is moved by rotation of a circular coating roll having a diameter of 350 to 400 mm, and the current collector has a curvature by the coating roll, and the lower die lip, the intermediate die lip and the upper die lip have such thickness that an average of increases of the curvature at a location corresponding to a lower plate top which is a region of the lower die lip located on the most downstream side along a movement direction of the current collector, an intermediate plate bottom which is a region of the intermediate die lip located on the most upstream side along the movement direction of the current collector, an intermediate plate top which is a region of the intermediate die lip located on the most downstream side along the movement direction of the current collector, and an upper plate bottom which is a region of the upper die lip located on the most upstream side along the movement direction of the current collector does not exceed 50 µm.

In the present disclosure, the thickness of the upper die lip may range from 0.8 to 4.5 mm, the thickness of the intermediate die lip may range from 0.8 to 8.8 mm, and the thickness of the lower die lip may range from 1 to 4.5 mm.

A method for coating an electrode active material slurry according to the present disclosure comprises forming an electrode active material slurry layer on a current collector using the dual slot die coater according to the present disclosure by supplying an electrode active material slurry while moving the current collector from the lower die lip to the upper die lip.

In the method for coating an electrode active material slurry according to the present disclosure, the electrode active material slurry layer may be formed with a thickness of 60 µm or more.

In the method for coating an electrode active material slurry according to the present disclosure, the electrode active material slurry may have a viscosity of 1000 cps or more.

Another method for coating an electrode active material slurry according to the present disclosure is as follows. The method for coating an electrode active material slurry using a dual slot die coater including a lower slot and an upper slot, for simultaneous extrusion coating of two types of electrode active material slurries on a surface of a continuously moving current collector through the lower slot and the upper slot, the dual slot die coater including a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming a front end with respect to the current collector, respectively, and a thickness of the lower die lip is larger than a thickness of the upper die lip and a thickness of the intermediate die lip, the method comprises simultaneously delivering the two types of electrode active material slurries on the current collector moving from the lower die lip to the upper die lip direction through a lower exit port and an upper exit port to form a double layer structure including a lower slurry layer and an upper slurry layer coated on the lower slurry layer, wherein the lower exit port in communication with the lower slot is formed between the lower die lip and the intermediate die lip, the upper exit port in communication with the upper slot is formed between the intermediate die lip and the upper die lip, and the upper exit port is spaced apart from the lower exit port downstream in a coating direction.

Here, a flow ratio of the electrode active material slurry forming the lower slurry layer and the electrode active material slurry forming the upper slurry layer may be 1:1.

Advantageous Effects

According to the present disclosure, among the lower die lip, the intermediate die lip and the upper die lip of the dual slot die coater, the thickness of the lower die lip is the largest. As the thickness of the lower die lip is larger, the window margin is wider. Accordingly, according to the present disclosure, the productivity increases, and the dynamic contact line may be used in a wide range of coating applications according to the intended coated product and quality.

According to the present disclosure, it is possible to raise the leaking limit. Additionally, it is possible to reduce the side ring area. When the coating gap reduces, the dynamic contact line moves in a direction that is opposite to the coating direction, and when it exceeds a predetermined level, leaking occurs, but the present disclosure achieves the wide window margin by increasing the thickness of the lower die lip, thereby preventing leaking even when the coating gap reduces. It is because the electrode active material slurry does not leak and a larger amount of electrode active material slurry resides in the lower die lip. According to the present disclosure, it is possible to prevent leaking when the coating gap is small or the slurry is supplied in a large amount relative to the movement speed of the current collector, thereby forming an electrode active material slurry layer with good coating quality.

According to the present disclosure, it is possible to prevent leaking without having to repeatedly adjust the initial conditions such as the coating gap, the properties of the coating solution, and the volume and speed of the flow of the coating solution to prevent leaking. To prevent a fat-edge caused by the Marangoni flow during drying from the edge, it is necessary to coat the edge thin in the coating step, but when the coating gap or the distance between the coating roll and the die lip is smaller, leaking gets severer. According to the present disclosure, since leaking is prevented even when the coating gap reduces, it is possible to prevent a pattern defect such as a fat-edge.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A dual slot die coater of the present disclosure is an apparatus including a lower slot and an upper slot to coat a coating solution in a double layer on a substrate. The 'substrate' described below is a current collector and the coating solution is an 'electrode active material slurry'. The slurry delivered through the lower slot and the slurry delivered through the upper slot may be electrode active material slurries having the same or different compositions (types of an active material, a conductive material and a binder), amounts (amounts of the active material, the conductive material and the binder) or properties. The dual slot die coater of the present disclosure is optimized for electrodes manufactured by simultaneous coating of two types of electrode active material slurries, or pattern coating by coating two types of electrode active material slurries in an alternating manner, or intermittent coating by the supply and stop of two types of electrode active material slurries in an alternating manner. However, the scope of the present disclosure is not necessarily limited thereto.

Figure 3:
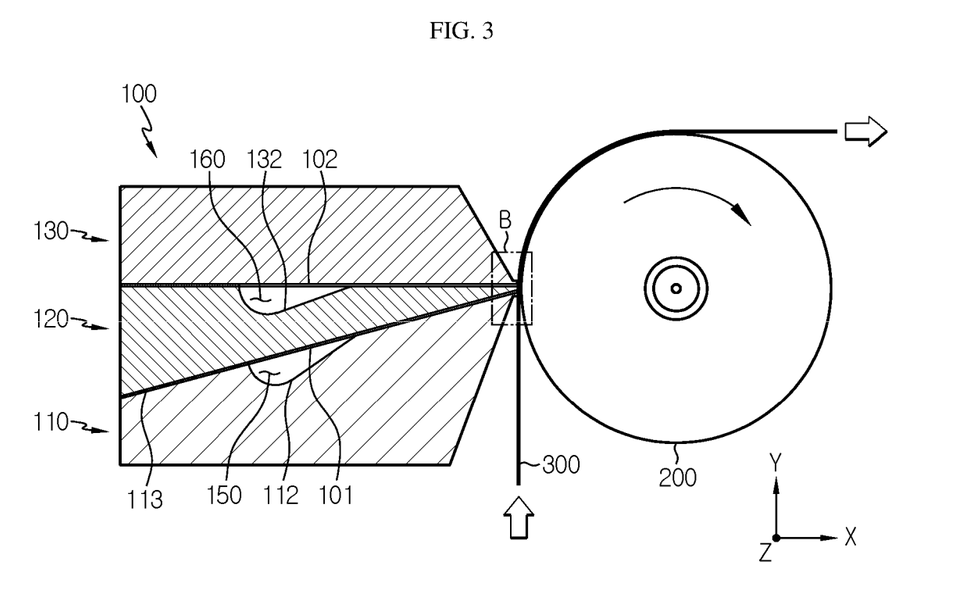
FIG. 3 is a schematic cross-sectional view of a dual slot die coater according to an embodiment of the present disclosure.
Figure 4:
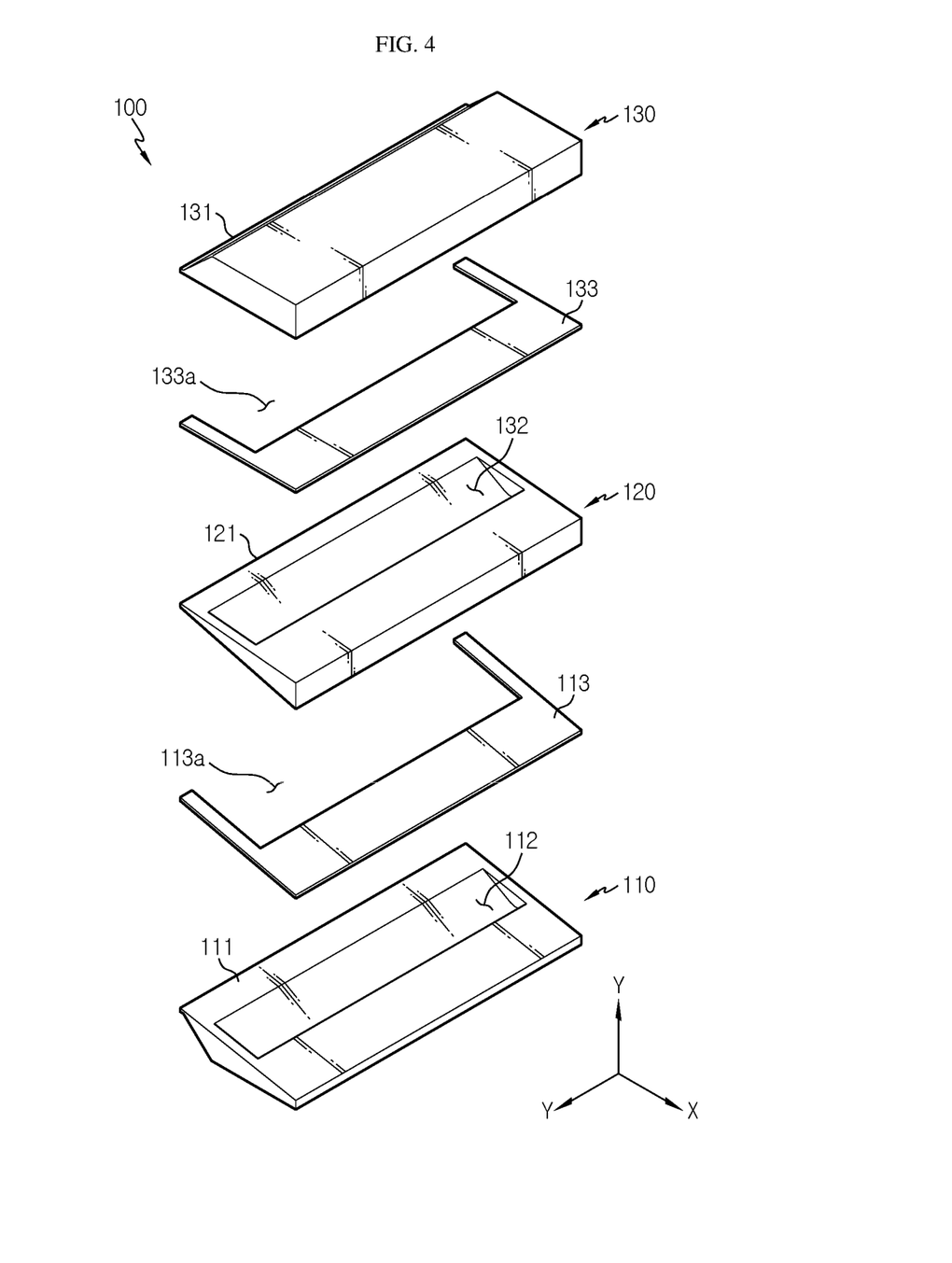
FIG. 4 is a schematic exploded perspective view of a dual slot die coater according to an embodiment of the present disclosure.
Figure 5:
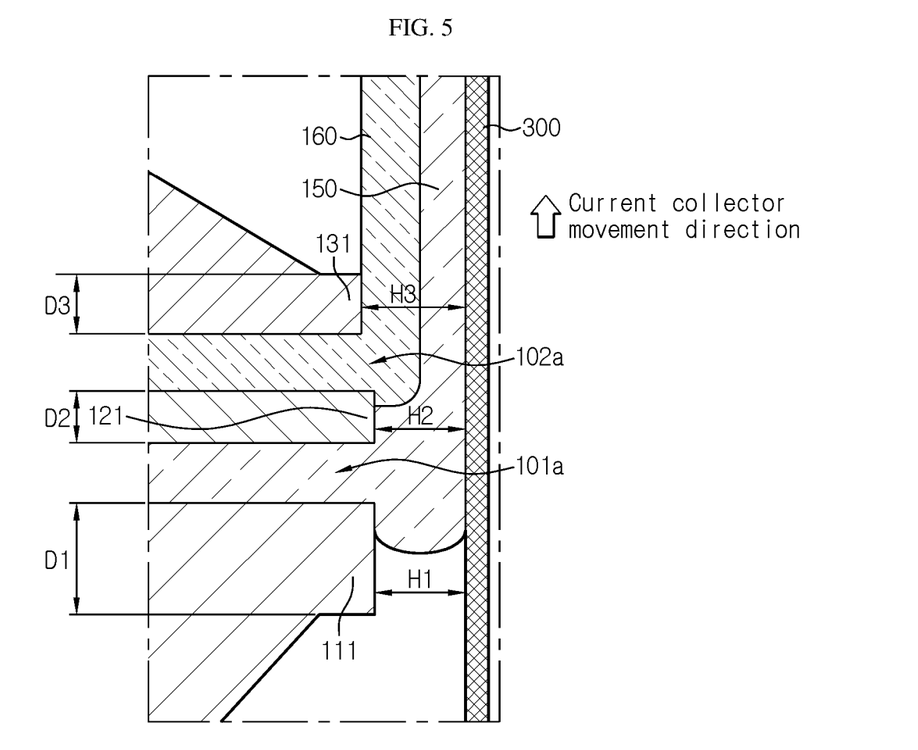
FIG. 5 is an enlarged diagram of section B in FIG. 3, showing an electrode active material slurry coating process using a dual slot die coater according to an embodiment of the present disclosure.

FIG. 3 is a schematic cross-sectional view of the dual slot die coater according to an embodiment of the present disclosure. FIG. 4 is a schematic exploded perspective view of the dual slot die coater according to an embodiment of the present disclosure. FIG. 5 is an enlarged diagram of section B in FIG. 3, showing an electrode active material slurry coating process using the dual slot die coater according to an embodiment of the present disclosure.

Referring to FIGS. 3 to 5, the dual slot die coater 100 according to the present disclosure includes a lower slot 101 and an upper slot 102, and is an apparatus capable of simultaneously, alternately or intermittently coating a same type of electrode active material slurry or two different types of electrode active material slurries on a current collector 300 through the lower slot 101 and the upper slot 102.

The dual slot die coater 100 includes a lower plate 110, an intermediate plate 120 positioned on the lower plate 110 and an upper plate 130 positioned on the intermediate plate 120. The lower plate 110, the intermediate plate 120 and the upper plate 130 are assembled together through fasteners such as bolts. The lower plate 110 is the lowermost block among the blocks of the dual slot die coater 100, and the surface facing the intermediate plate 120 is inclined at an angle of approximately 30° to 60° to the bottom surface (X-Z plane).

The lower slot 101 may be formed at a location in which the lower plate 110 and the intermediate plate 120 face each other. For example, a first spacer 113 is interposed between the lower plate 110 and the intermediate plate 120 to form a gap between, and the lower slot 101 corresponding to a passage for the flow of a first electrode active material slurry 150 may be formed. In this case, the thickness of the first spacer 113 determines the vertical width (Y-axis direction, a slot gap) of the lower slot 101.

As shown in FIG. 4, the first spacer 113 has a first opening portion 113*a* which is cut at an area, and may be interposed in the remaining portion except one side in the edge area of the facing surface of each of the lower plate 110 and the intermediate plate 120. Accordingly, a lower exit port 101*a* through which the first electrode active material slurry 150 emerges is only formed between the front end of the lower plate 110 and the front end of the intermediate plate 120. The front end of the lower plate 110 and the front end of the intermediate plate 120 are defined as a lower die lip 111 and an intermediate die lip 121, respectively, and in other words, the lower exit port 101*a* is formed by the spacing between the lower die lip 111 and the intermediate die lip 121.

For reference, the first spacer 113 acts as a gasket to prevent the leakage of the first electrode active material slurry 150 through the gap between the lower plate 110 and the intermediate plate 120 except the area where the lower exit port 101*a* is formed, and thus the first spacer 113 is preferably made of a material having sealing ability.

The lower plate 110 includes a first manifold 112 having a predetermined depth on the surface facing the intermediate plate 120, and the first manifold 112 is in communication with the lower slot 101. Although not shown in the drawing, the first manifold 112 is connected to a first electrode active material slurry supply chamber (not shown) installed outside with a supply pipe and is supplied with the first electrode active material slurry 150. When the first manifold 112 is fully filled with the first electrode active material slurry 150, the flow of the first electrode active material slurry 150 is guided along the lower slot 101 and comes out of the lower exit port 101*a*.

The intermediate plate 120 is a block disposed in the middle of the die blocks of the dual slot die coater 100, and is interposed between the lower plate 110 and the upper plate 130 to form a dual slot. The intermediate plate 120 of this embodiment is a right-angled triangle in cross section, but is not necessarily limited thereto, and for example, the intermediate plate 120 may be, for example, an isosceles triangle in cross section.

The upper plate 130 is positioned facing the upper surface of the intermediate plate 120 parallel to the bottom surface. As described above, the upper slot 102 is formed at a location in which the intermediate plate 120 and the upper plate 130 face each other.

In the same way as the lower slot 101 described above, a second spacer 133 may be interposed between the intermediate plate 120 and the upper plate 130 to form a gap between. Accordingly, the upper slot 102 corresponding to a passage for the flow of a second electrode active material slurry 160 is formed. In this case, the vertical width (Y-axis direction, a slot gap) of the upper slot 102 is determined by the second spacer 133.

In addition, the second spacer 133 having the similar structure to the first spacer 113 has a second opening portion 133*a* which is cut at an area, and is interposed in the remaining portion except one side in the edge area of the facing surface of each of the intermediate plate 120 and the upper plate 130. Likewise, the circumferential direction except the front side of the upper slot 102 is blocked, and the upper exit port 102*a* is only formed between the front end of the intermediate plate 120 and the front end of the upper plate 130. The front end of the upper plate 130 is defined as an upper die lip 131, and in other words, the upper exit port 102*a* is formed by the spacing between the intermediate die lip 121 and the upper die lip 131.

In addition, the upper plate 130 includes a second manifold 132 having a predetermined depth on the surface facing the intermediate plate 120, and the second manifold 132 is in communication with the upper slot 102. Although not shown in the drawings, the second manifold 132 is connected to a supply chamber for the second electrode active material slurry 160 installed outside with a supply pipe and is supplied with the second electrode active material slurry 160. When the second electrode active material slurry 160 is supplied from the external source along the supply pipe, and the second manifold 132 is fully filled with the second electrode active material slurry 160, the flow of the second electrode active material slurry 160 is guided along the upper slot 102 in communication with the second manifold 132 and comes out of the upper exit port 102*a*.

The upper slot 102 and the lower slot 101 form a predetermined angle, and the angle may be approximately 30° to 60°. The upper slot 102 and the lower slot 101 may intersect at one point, and the upper exit port 102*a* and the lower exit port 101*a* may be provided near the intersection point. Accordingly, the locations at which the first electrode active material slurry 150 and the second electrode active material slurry 160 emerge may converge to approximately one point.

The first and second manifolds 112, 132 are formed in the lower plate 110 and the upper plate 130, respectively. In this case, the intermediate plate 120 that is the most structurally vulnerable may be less prone to deformation.

Meanwhile, the dual slot die coater 100 may further include a first valve to open/close the delivery through the lower exit port 101*a*, a second valve to open/close the delivery through the upper exit port 102*a*, and a valve control unit to control the opening/closing of the first and second valves.

According to the dual slot die coater 100 having the above-described configuration, a rotatable coating roll 200 is positioned on the front side of the dual slot die coater 100, and the coating roll 200 may be rotated to move the current collector 300 to be coated, while continuously contacting the first electrode active material slurry 150 and the second electrode active material slurry 160 with the surface of the current collector 300, and thereby the current collector 300 may be simultaneously coated in a double layer structure. Alternatively, pattern coating may be intermittently formed on the current collector 300 by performing the supply and stop of the first electrode active material slurry 150 and the supply and stop of the second electrode active material slurry 160 in an alternating manner by the closing/opening control of the first and second valves through the valve control unit.

The first electrode active material slurry 150 is coated on the current collector 300 to form a lower slurry layer, and almost at the same time, the second electrode active material slurry 160 is coated on the lower slurry layer to form an upper slurry layer.

Referring further to FIG. 5, the structure of the die lip of the dual slot die coater according to an embodiment of the present disclosure and a method for coating an electrode active material slurry using the dual slot die coater will be described in detail. The dual slot die coater 100 according to the present disclosure has a difference in lip thickness between the upper/intermediate/lower plates.

The lower die lip thickness D1 is larger than the upper die lip thickness D3, and the lower die lip thickness D1 is larger than the intermediate die lip thickness D2. Accordingly, the lower die lip thickness D1 is larger than the average thickness of the upper die lip thickness D3 and the intermediate die lip thickness D2. As described above, the lower die lip thickness D1 is the largest. D1>D2, D1>D3, D1>(D2+D3)/2. The upper die lip thickness D3 may be equal to the intermediate die lip thickness D2.

The lower die lip thickness D1:the upper die lip thickness D3 may be 1.2:1 or more. That is, the lower die lip thickness D1 may be at least 1.2 times larger than the upper die lip thickness D3. When the lower die lip thickness D1 is larger than the upper die lip thickness D3, the window margin is wider as intended, but when the lower die lip thickness D1 is at least 1.2 times larger than the upper die lip thickness D3, it is possible to prevent leaking. When the lower die lip thickness D1 is equal to the upper die lip thickness D3 or the upper die lip thickness D3 is larger than the lower die lip thickness D1, leaking occurs.

The lower die lip thickness D1:the intermediate die lip thickness D2 may be 1.2:1 or more. That is, the lower die lip thickness D1 is at least 1.2 times larger than the intermediate die lip thickness D2. When the lower die lip thickness D1 is larger than the intermediate die lip thickness D2, the window margin is wider as intended, but when the lower die lip thickness D1 is at least 1.2 times larger than the intermediate die lip thickness D2, it is possible to prevent leaking. When the lower die lip thickness D1 is equal to the intermediate die lip thickness D2, leaking occurs. When the intermediate die lip thickness D2 is larger than the lower die lip thickness D1, leaking does not occur, but a pattern defect occurs.

According to the present disclosure, the thickness of the lower die lip 111 is the largest. The inventors found that as the lower die lip 111 is thicker, the window margin is wider. Accordingly, it may be easier to control the coating gap or set the initial condition. Accordingly, according to the present disclosure, productivity increases, and the dynamic contact line coating may be used in a wide range of coating applications according to the intended coated product and quality.

According to the present disclosure, with the wider window margin, it is possible to raise the leaking limit. Additionally, it is possible to reduce the side ring area. As the coating gap reduces, the dynamic contact line moves in a direction that is opposite to the coating direction, and when it exceeds a predetermined level, leaking occurs, but the present disclosure may reduce leaking by increasing the thickness of the lower die lip 111. It is because the electrode active material slurry does not leak and the electrode active material slurry in a large amount resides in the lower die lip 111. According to the present disclosure, it is possible to reduce leaking even when the coating gap is small or the slurry is supplied a large amount relative to the movement speed of the current collector 300.

According to the dual slot die coater according to the present disclosure and the method for coating an electrode active material slurry using the same, the formation of the active material layer of double layer structure on the current collector may increase the procedural efficiency and reduce the defect rate.

It is desirable that the thickness condition of the lower die lip 111, the upper die lip 131 and the intermediate die lip 121 is satisfied, and the thickness of the thinnest die lip among the upper die lip 131 and the intermediate die lip 121 is equal to or larger than 800 μm (0.8 mm). When the thickness of the thinnest die lip is smaller than 800 μm, the die block is too thin and the slot gap changes, which makes uniform coating difficult. Thus, the thickness is at least 800 μm. When the thickness of the thinnest die lip is 800 μm, the thickness of the lower die lip 111 may be equal to or larger than 960 μm that is 1.2 times larger than the thickness of the thinnest die lip.

Preferably, the thickness of the thinnest die lip is equal to or larger than 800 μm. It may be a value that takes into account the pressure of the electrode active material slurry coming out. More preferably, the thickness of the thinnest die lip is equal to or larger than 1 mm. This may be a value set for precise machining. When the thickness of the thinnest die lip is 800 μm, the thickness of the lower die lip 111 may be equal to or larger than 0.96 mm that is 1.2 times larger than the thickness of the thinnest die lip. More preferably, the thickness of the thinnest die lip is equal to or larger than 1 mm. This may be also a value set for precise machining. The distance H3 between the current collector 300 and the upper die lip 131 may be larger than the distance H2 between the current collector 300 and the intermediate die lip 121 and the distance H1 between the current collector 300 and the lower die lip 111. This distance difference may be formed by moving back the upper die lip 131 which is the lip of the upper plate 130 in a direction that is opposite to the delivery direction than the lower die lip 111 which is the lip of the lower plate 110 and the intermediate die lip 121 which is the lip of the intermediate plate 120, far away from the current collector 300, to form the lip step. It is possible to reduce the loading out area through the step between the lips. The distance H1 between the current collector 300 and the lower die lip 111 may be equal to the distance H2 between the current collector 300 and the intermediate die lip 121.

To form the lip step, the dual slot die coater 100 may further include a control unit to individually move back the upper die lip 131 after placing the lower die lip 111, the intermediate die lip 121 and the upper die lip 131 in linear alignment with respect to the current collector 300. In this configuration, the upper die lip 131 is disposed at a more rearward position from the current collector 300 than the lower die lip 111 and the intermediate die lip 121.

Accordingly, the predetermined step is formed between the lower exit port 101*a* and the upper exit port 102*a*. The step is a result of subtracting the distance H1 between the current collector 300 and the lower die lip 111 from the distance H3 between the current collector 300 and the upper die lip 131. The lower exit port 101*a* and the upper exit port 102*a* are spaced by the step apart from each other along the horizontal direction, thereby preventing the second electrode active material slurry 160 coming out of the upper exit port 102*a* from entering the lower exit port 101*a*, or the first electrode active material slurry 150 coming out of the lower exit port 101*a* from entering the upper exit port 102*a*. In addition, the intermediate die lip 121 presses down the first electrode active material slurry 150, but the upper die lip 131 does not press down the second electrode active material slurry 160, and thus the width of the lower slurry layer coated with the first electrode active material slurry 150 is equal to the width of the upper slurry layer coated with the second electrode active material slurry 160.

As shown in the drawing, when the lip positions are set, the upper exit port 102a is spaced apart from the lower exit port 101a downstream in the coating direction. An active material layer may be formed with a double layer structure on the current collector 300 by simultaneously delivering the first and second electrode active material slurries 150, 160 through the lower exit port 101a and the upper exit port 102a while moving the current collector 300 from the lower die lip 111 to the upper die lip 131.

The first electrode active material slurry 150 issuing from the lower exit port 101a is coated on the current collector 300 to form the lower slurry layer, and at the same time, the second electrode active material slurry 160 issuing from the upper exit port 102a is coated thereon to form the upper slurry layer. The dual slot die coater 100 of the present disclosure can form a double layer structure including the upper slurry layer on the lower slurry layer.

Each of the average thickness of the lower slurry layer formed by the first electrode active material slurry 150 emerging through the lower exit port 101a and the average thickness of the upper slurry layer formed by the second electrode active material slurry 160 emerging through the upper exit port 102a may be 60 μm or more. Each average thickness may be 200 μm or less. In general, the average particle size of the secondary battery active material is about 10 μm, but the particle size follows the commonly used normal distribution, so it is general that d(90) or d(max) is larger than 10 μm (here, the average particle size is d(50), and may be defined as a particle size corresponding to 50% cumulative mass percentage in the particle size distribution curve measured by laser diffraction. It will be understood that d(90) indicates that 90% of the total particle have a particle size that is equal to or smaller than the above-described value). Since the slurry layer includes the active material, it is difficult to form the slurry layer less than 40 μm in thickness. Additionally, when the thickness of the slurry layer is equal to or larger than 60 μm, it is possible to smoothly coat without active material clogging at the coating gap usually maintained. Additionally, when the thickness of the slurry layer is equal to or larger than 200 μm, it may be advantageous, but it is difficult to realistically achieve the coating amount actually used in the secondary battery of more than 200 μm.

For example, the method for coating an electrode active material slurry of the present disclosure may be applied to the manufacture of the positive electrode of the secondary battery. The positive electrode includes a current collector and a positive electrode active material layer formed on the surface of the current collector. The current collector may include any material which exhibits electrical conductivity, for example, Al, Cu, and a proper one may be used according to the polarity of the current collector of the electrode well known in the field of secondary batteries. The positive electrode active material layer may further include at least one of a positive electrode active material particles, a conductive material or a binder. Additionally, the positive electrode may further include various types of additives to enhance or improve the electoral and chemical properties.

The active material is not limited to a particular type and may include any material used for positive electrode active materials of lithium ion secondary batteries. Its non-limiting example may include at least one of layered compounds or compounds with one or more transition metal substitution such as lithium manganese composite oxide ($LiMn_2O_4$, $LiMnO_2$), lithium cobalt oxide ($LiCoO_2$), lithium nickel oxide ($LiNiO_2$); lithium manganese oxide of formula $Li_{1+x}Mn_{2-x}O_4$ (x is 0~0.33), $LiMnO_3$, $Li_2MnO_3$, $LiMnO_2$; lithium copper oxide ($Li_2CuO_2$); vanadium oxide, for example, $LiV_3O_8$, $LiV_3O_4$, $V_2O_5$, $Cu_2V_2O_7$; Ni site lithium nickel oxide represented by formula $LiNi_{1-x}M_xO_2$ (M=Co, Mn, Al, Cu, Fe, Mg, B or Ga, x=0.01~0.3); lithium manganese composite oxide represented by formula $LiMn_{2-x}M_xO_2$ (M=Co, Ni, Fe, Cr, Zn or Ta, x=0.01~0.1) or $Li_2Mn_3MO_8$ (M=Fe, Co, Ni, Cu or Zn); $LiMn_2O_4$ with partial substitution of alkali earth metal ion for Li in the formula; disulfide compounds; or $Fe_2(MoO_4)_3$. In the present disclosure, the positive electrode may include a solid electrolyte material, for example, at least one of a polymer based solid electrolyte, an oxide based solid electrolyte or a sulfide based solid electrolyte.

The conductive material may be typically added in an amount of 1 wt % to 20 wt % based on the total weight of the mixture including the electrode active material. The conductive material is not limited to a particular type, and may include any material having conductive properties without causing any chemical change to the corresponding battery, for example, at least one selected from graphite, for example, natural graphite or artificial graphite; carbon black, for example, carbon black, acetylene black, ketjen black, channel black, furnace black, lamp black, thermal black; conductive fibers, for example, carbon fibers or metal fibers; metal powder, for example, carbon fluoride, aluminum and nickel powder; conductive whiskers, for example, zinc oxide and potassium titanate; conductive metal oxide, for example, titanium oxide; and conductive materials, for example, polyphenylene derivatives.

The binder is not limited to a particular type and may include any material which assists in bonding the active material and the conductive material and bonding to the current collector, example, polyvinylidene fluoride polyvinylalcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluoro rubber and a variety of copolymers thereof. The binder may be typically included in the range of 1 wt % to 30 wt % or 1 wt % to 10 wt % based on 100 wt % of the electrode layer. The electrode may be a negative electrode. The negative electrode includes a current collector and a negative electrode active material layer formed on the surface of the current collector. The negative electrode active material layer may further include at least one of negative electrode active material particles, a conductive material or a binder. Additionally, the negative electrode may further include a variety of additives to enhance or improve the electrical and chemical properties.

The negative electrode active material may include carbon materials, for example, graphite, amorphous carbon, diamond phase carbon, fullerene, carbon nanotubes and carbon nanohorns, lithium metal materials, alloy based materials, for example, silicon or tin alloy based materials, oxide based materials, for example, $Nb_2O_5$, $Li_5Ti_4O_{12}$, $TiO_2$, or a composite thereof. For the conductive material, the binder and the current collector of the negative electrode, a reference may be made to the positive electrode.

In particular, the electrode manufactured according to the present disclosure is preferably a positive electrode. Preferably, the positive electrode has a structure in which a lower active material layer and an upper active material layer are formed on a current collector in a sequential order. The lower active material layer contains a conductive material in a larger amount, and the upper active material layer contains a conductive material in a smaller amount. In this case, the amount of the conductive material in the lower active material layer may be adjusted to the range between 0.5 and 5 weight %. It is possible to increase the amount of the active material on the electrode surface and reduce the electrical conductivity at a predetermined level by reducing the amount the conductive material in the upper active material layer. In particular, when the amount of the conductive material in the upper active material layer is controlled to a very low level of 0.02 weight % or less, it is possible to reduce the heat generation reaction in the event of an internal short circuit of the cell.

In another example, the average particle size P1 of the active material that forms the lower active material layer ranges between 50 and 95% of the average particle size P2 of the active material that forms the upper active material layer. In this case, a smaller particle size active material is applied to the lower active material layer, and a larger particle size active material is applied to the upper active material layer, which makes electrolyte solution wetting easy and induces the smooth movement of ions or holes.

Here, a flow ratio of the first electrode active material slurry 150 and the second electrode active material slurry 160 may be 1:1. The first and second electrode active material slurries 150, 160 may include graphite, a conductive material, CMC and a binder. The viscosity of the first and second electrode active material slurries 150, 160 may be equal to or higher than 1000 cps. The viscosity of the slurry for forming a secondary battery electrode may be 2000 cps to 30000 cps. For example, the negative electrode active material slurry may have viscosity of 2000 cps to 4000 cps. The positive electrode active material slurry may have viscosity of 8000 cps to 30000 cps. Since the dual slot die coater 100 of the present disclosure is configured to coat a coating solution having the viscosity of 1000 cps or more, the dual slot die coater 100 of the present disclosure is different from the structure of a device for coating a coating solution having lower viscosity such as a commonly used resin solution, for example, a photosensitive emulsion, a magnetic fluid, an antireflective solution, an antiglare solution, a solution for improving the viewing angle and a dye solution for color filter, and cannot be arrived at by modifying such device. Since the dual slot die coater 100 of the present disclosure is configured to coat the slurry including the secondary battery active material having the average particle size of about 10 μm, the dual slot die coater 100 of the present disclosure is different from the structure of a device for coating a coating solution without particles of the above-described particle size and cannot be arrived at by modifying such device. The dual slot die coater 100 of the present disclosure is optimal for a coater for an electrode.

Although FIG. 5 is shown irrespective of the curvature of the coating roll 200, actually the current collector 300 placed on the coating roll 200 also has a curvature due to the curvature of the coating roll 200, and thus the coating gap between the die lips 111, 121, 131 and the current collector 300 varies depending on the location. As the lower die lip 111 is thicker, the window margin is wider, but the coating gap deviation increases. This is the same case with the other die lips 121, 131. Accordingly, the inventors propose the preferred thickness range of each die lip 111, 121, 131 including the thickest lower die lip 111. That is, since the coating roll 200 is circular, when the die lips 111, 121, 131 are too thick, the coating gap at each position changes. To achieve coating uniformity while preventing fat-edge by making the lower die lip 111 thickest, the present disclosure proposes an appropriate maximum value of the thickness of each die lip 111, 121, 131.

Figure 6:
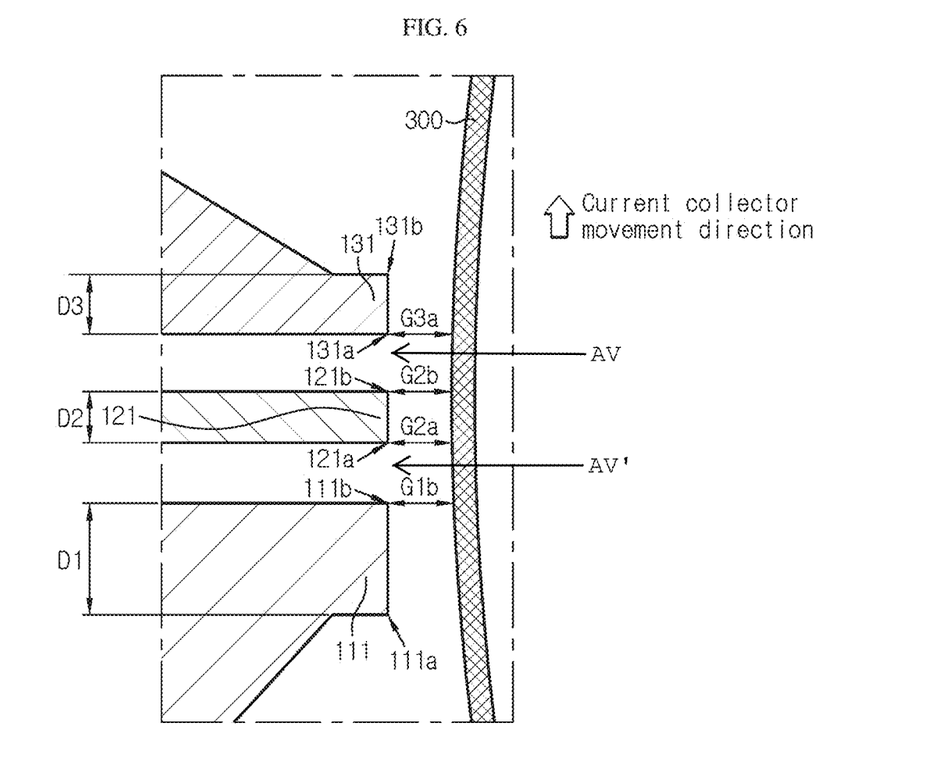
FIG. 6 is a diagram illustrating a thickness range of each die lip in a dual slot die coater according to an embodiment of the present disclosure.

FIG. 6 is a diagram illustrating the thickness range of each die lip in the dual slot die coater according to an embodiment of the present disclosure.

The die lips 111, 121, 131 are aligned in line. A region of the lower die lip 111 located on the most upstream side along the movement direction of the current collector is defined as a lower plate bottom 111a, and a region of the lower die lip 111 located on the most downstream side is defined as a lower plate top 111b. A region of the intermediate die lip 121 located on the most upstream side along the movement direction of the current collector is defined as an intermediate plate bottom 121a, and a region of the intermediate die lip 121 located on the most downstream side is defined as an intermediate plate top 121b. A region of the upper die lip 131 located on the most upstream side along the movement direction of the current collector is defined as an upper plate bottom 131a, and a region of the upper die lip 131 located on the most downstream side is defined as an upper plate top 131b.

An intermediate plate bottom coating gap G2a which is the coating gap at the intermediate plate bottom 121a is the target coating gap PV+a curvature increase at a location corresponding to the intermediate plate bottom 121a. Likewise, a lower plate top coating gap G1b which is the coating gap at the lower plate top 111b is the target coating gap PV+a curvature increase at a location corresponding to the lower plate top 111b. An upper plate bottom coating gap G3a which is the coating gap at the upper plate bottom 131a is the target coating gap PV+a curvature increase at a location corresponding to the upper plate bottom 131a. Likewise, an intermediate plate top coating gap G2b which is the coating gap at the intermediate plate top 121b is the target coating gap PV+a curvature increase at a location corresponding to the intermediate plate top 121b.

When an average of the curvature increase at the location corresponding to the intermediate plate bottom 121a and the curvature increase at the location corresponding to the lower plate top 111b is AV', and an average of the curvature increase at the location corresponding to the upper plate bottom 131a and the curvature increase at the location corresponding to the intermediate plate top 121b is AV, AV' and AV change depending on the diameter of the coating roll 200, the thickness of each die lip 111, 121, 131, the thickness of the spacer 113, 133 used, and which part of the dual slot die coater 100 at which the coating roll 200 is centered.

In case that the thickness of the spacer 113, 133 is 0.2 to 3 mm, the diameter of the coating roll 200 is 350 to 400 mm, and the coating roll 200 is centered on the upper plate bottom 131a or the lower plate top 111b, when AV' and AV are equal to or smaller than 50 μm, the coating quality is not affected. When AV' and AV do not exceed 50 μm, the maximum of the thickness D3 of the upper die lip 131 is 4.5 mm. The maximum of the thickness D2 of the intermediate die lip 121 is 8.8 mm. The maximum of the thickness D1 of the lower die lip 111 is 4.5 mm.

Accordingly, when considering together with the minimum value of each die lip described above, the thickness D3 of the upper die lip 131 may range from 0.8 to 4.5 mm, the thickness D2 of the intermediate die lip 121 may range from 0.8 to 8.8 mm, and the thickness D1 of the lower die lip 111 may range from 1 to 4.5 mm.

Hereinafter, the present disclosure will be described in more detail through experimental examples.

EXPERIMENTAL EXAMPLE

For electrode quality evaluation, an electrode active material slurry layer of double layer structure is formed with varying thicknesses of the die lips 111, 121, 131. The electrode active material slurries 150, 160 are a mixture of graphite:conductive material:CMC:binder at a ratio of 95:1:1:3 in water. The coating gap is 80 μm, and the flow ratio of the upper layer slurry and the lower layer slurry is 1:1. The coating rate is 40 m/min.

Table 1 summarizes the die lip thickness and the thickness ratio, and the electrode quality results.

TABLE 1

| | Die lip thickness (mm) | | | Die lip thickness ratio | | | Electrode quality | |
| | | | | Lower/ | Lower/ | Lower/(Average of upper and | | |
| No. | Upper | Intermediate | Lower | Upper | Intermediate | intermediate) | Simulation | Actual test |
|---|---|---|---|---|---|---|---|---|
| 1 | 1 | 1 | 1 | 1 | 1 | 1 | Leaking | Leaking |
| 2 | 2 | 2 | 2 | 1 | 1 | 1 | Leaking | Leaking |
| 3 | 1 | 1 | 1.5 | 1.5 | 1.5 | 1.5 | Good | Good |
| 4 | 1 | 1 | 2 | 2 | 2 | 2 | Good | Good |
| 5 | 1 | 1 | 1.2 | 1.2 | 1.2 | 1.2 | Good | Good |
| 6 | 1.5 | 0.5 | 1.2 | 0.8 | 2.4 | 1.2 | Leaking | None |
| 7 | 0.5 | 1.5 | 1.2 | 2.4 | 0.8 | 1.2 | Good | Fat-edge |

In experimental example 1, as opposed to the present disclosure, the upper die lip 131, the intermediate die lip 121 and the lower die lip 111 are equally 1 mm in thickness. As a result of simulation and actual test, leaking occurred. A Carreau-Yasuda viscosity model was used in the simulation.

Figure 7:
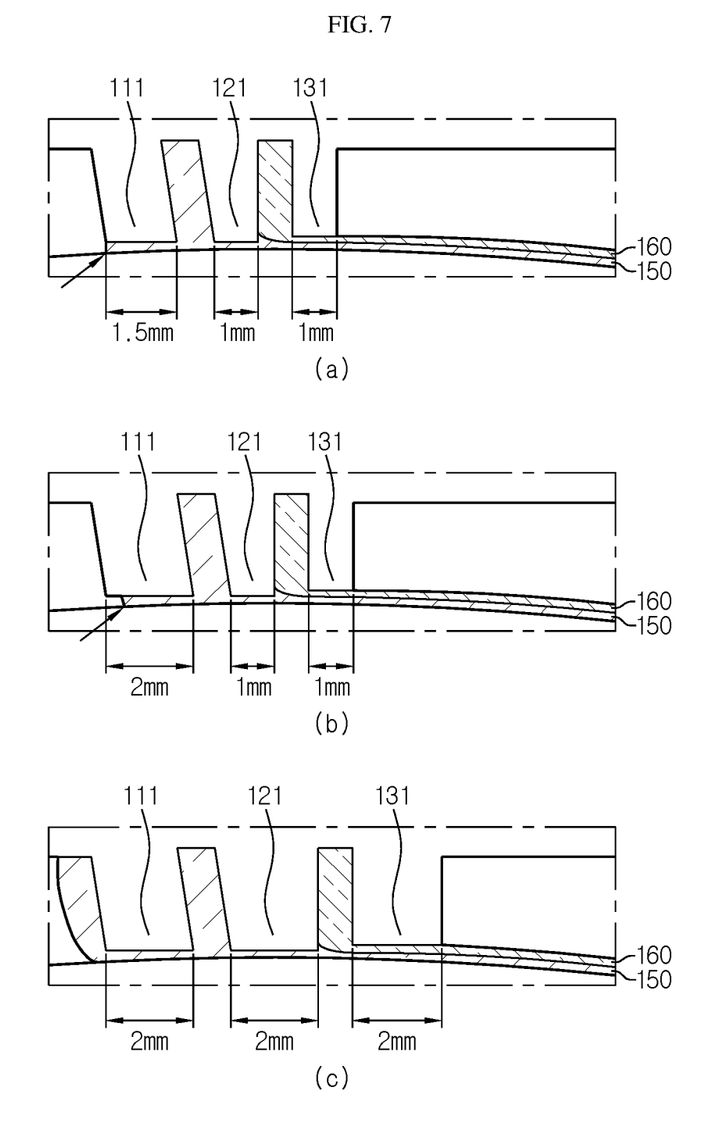
FIG. 7 is a simulation diagram of various experimental examples.

In experimental example 2, each of the upper die lip 131, the intermediate die lip 121 and the lower die lip 111 is 2 mm in thickness. Each die lip is twice thicker than experimental example 1, but its ratio is equally 1:1:1. In the same way as experimental example 1, as a result of simulation and actual test, leaking occurred. (c) of FIG. 7 shows that leaking of the first electrode active material slurry 150 occurred in the lower die lip 111 as a result of simulation of experimental example 2.

In experimental examples 3 to 5, the lower die lip 111 is the thickest. That is, the die lip thickness requirement of the present disclosure is met. As a result of simulation and actual test in experimental examples 3 to 5, leaking or side ring did not occur, and the coating quality is good. (a) of FIG. 7 shows experimental example 3, and (b) shows experimental example 4. The arrow indicates the dynamic contact line. The lower die lip 111 of experimental example 4 is thicker than experimental example 3. In experimental example 4, it can be seen that the dynamic contact line is disposed at the inner position than the lower die lip 111. That is, the window margin is wider. Accordingly, according to the present disclosure, as shown in experimental examples 3 to 5, it is possible to prevent leaking and achieve the wider window margin with the increasing thickness of the lower die lip 111. The thickness of the lower die lip 111 does not increase without limit, and is adjusted to place the dynamic contact line at an appropriate position according to the intended coated product and quality when coating.

In experimental example 6, as opposed to the present disclosure, the upper die lip 131 is the thickest. As a result of simulation, leaking occurred.

In experimental example 7, as opposed to the present disclosure, the thickness of the intermediate die lip 121 is the largest. As a result of simulation, leaking did not occur, but in the actual test, a fat-edge pattern defect occurred, resulting in fat electrode edge.

While the present disclosure has been described with respect to a limited number of embodiments and drawings, the present disclosure is not limited thereto, and it is obvious to those skilled in the art that a variety of changes and modifications may be made thereto within the technical aspects of the present disclosure and the appended claims and their equivalent scope.

Although the terms indicating directions such as up, down, left, and right are used herein, these terms are used only for convenience of description, and it is apparent to those skilled in the art that these terms may be changed depending on the position of a target object or an observer.

What is claimed is:

1. A dual slot die coater for extrusion coating of an electrode active material slurry on a surface of a continuously moving current collector comprising:
    a lower slot and an upper slot;
    a lower plate, an intermediate plate positioned on the lower plate, and an upper plate positioned on the intermediate plate, the lower slot being formed between the lower plate and the intermediate plate, and the upper slot being formed between the intermediate plate and the upper plate,
    wherein the lower plate, the intermediate plate and the upper plate have a lower die lip, an intermediate die lip and an upper die lip, each forming a front end with respect to the current collector, respectively,
    a thickness of the lower die lip is larger than a thickness of the upper die lip and a thickness of the intermediate die lip, and
    wherein a thinner die lip among the upper die lip and the intermediate die lip is 800 μm or more in thickness.

2. The dual slot die coater according to claim 1, wherein the thickness of the lower die lip:the thickness of the upper die lip is 1.2:1 or more.

3. The dual slot die coater according to claim 1, wherein the thickness of the lower die lip:the thickness of the intermediate die lip is 1.2:1 or more.

4. The dual slot die coater according to claim 1, wherein a lower exit port in communication with the lower slot is formed between the lower die lip and the intermediate die lip, an upper exit port in communication with the upper slot is formed between the intermediate die lip and the upper die lip, the slurry forming a lower slurry layer is delivered on the current collector through the lower exit port, and the slurry forming an upper slurry layer is delivered on the lower slurry layer on the current collector through the upper exit port, the upper exit port being spaced apart from the lower exit port downstream in a coating direction.

5. The dual slot die coater according to claim 1, wherein a distance between the current collector and the upper die lip is larger than a distance between the current collector and the lower die lip and a distance between the current collector and the intermediate die lip.

6. The dual slot die coater according to claim 1, wherein the current collector is moved by rotation of a circular coating roll having a diameter of 350 to 400 mm, and the current collector has a curvature by the coating roll, and
the lower die lip, the intermediate die lip and the upper die lip have such thickness that an average of increases of the curvature at a location corresponding to a lower plate top, which is a region of the lower die lip located on the most downstream side along a movement direction of the current collector; an intermediate plate bottom, which is a region of the intermediate die lip located on the most upstream side along the movement direction of the current collector; an intermediate plate top, which is a region of the intermediate die lip located on the most downstream side along the movement direction of the current collector; and an upper plate bottom, which is a region of the upper die lip located on the most upstream side along the movement direction of the current collector, does not exceed 50 µm.

7. The dual slot die coater according to claim 1, wherein the thickness of the upper die lip ranges from 0.08 to 4.5 mm, the thickness of the intermediate die lip ranges from 0.08 to 8.8 mm, and the thickness of the lower die lip ranges from 1 to 4.5 mm.

8. A method for coating an electrode active material slurry, comprising:
forming an electrode active material slurry layer on a current collector using the dual slot die coater according to claim 1 by supplying the electrode active material slurry while moving the current collector from the lower die lip to the upper die lip.

9. The method for coating an electrode active material slurry according to claim 8, wherein the electrode active material slurry layer is formed with a thickness of 60 µm or more.

10. The method for coating an electrode active material slurry according to claim 8, wherein the electrode active material slurry has a viscosity of 1000 cps or more.

11. A method for coating the electrode active material slurry, comprising:
performing simultaneous extrusion coating of two types of electrode active material slurries on the surface of the continuously moving current collector, through the lower slot and the upper slot of the dual slot die coater according to claim 1,
wherein the performing simultaneous extrusion coating includes simultaneously delivering the two types of electrode active material slurries on the current collector moving in a direction from the lower die lip to the upper die lip, through a lower exit port and an upper exit port, to form a double layer structure including a lower slurry layer and an upper slurry layer coated on the lower slurry layer, and
wherein the lower exit port in communication with the lower slot is formed between the lower die lip and the intermediate die lip, the upper exit port in communication with the upper slot is formed between the intermediate die lip and the upper die lip, and the upper exit port is spaced apart from the lower exit port downstream in a coating direction.

12. The method for coating an electrode active material slurry according to claim 11, wherein each of the lower slurry layer and the upper slurry layer is formed with a thickness of 60 µm or more.

13. The method for coating an electrode active material slurry according to claim 11, wherein the electrode active material slurry has a viscosity of 1000 cps or more.

14. The method for coating an electrode active material slurry according to claim 11, wherein a flow ratio of the electrode active material slurry forming the lower slurry layer and a flow ratio of the electrode active material slurry forming the upper slurry layer is 1:1.

15. A dual slot die coater for extrusion coating of an electrode active material slurry on a surface of a continuously moving current collector comprising:
a lower slot and an upper slot;
a lower plate, an intermediate plate positioned on the lower plate, and an upper plate positioned on the intermediate plate, the lower slot being formed between the lower plate and the intermediate plate, and the upper slot being formed between the intermediate plate and the upper plate,
wherein the lower plate, the intermediate plate and the upper plate have a lower die lip, an intermediate die lip and an upper die lip, each forming a front end with respect to the current collector, respectively,
a thickness of the lower die lip is larger than a thickness of the upper die lip and a thickness of the intermediate die lip, and
wherein the current collector is moved by rotation of a circular coating roll having a diameter of 350 to 400 mm, and the current collector has a curvature by the coating roll, and
the lower die lip, the intermediate die lip and the upper die lip have such thickness that an average of increases of the curvature at a location corresponding to a lower plate top; an intermediate plate bottom; an intermediate plate top; and an upper plate bottom does not exceed 50 µm.

16. The dual slot die coater according to claim 15,
wherein the lower plate top is a region of the lower die lip located on the most downstream side along a movement direction of the current collector,
wherein the intermediate plate bottom is a region of the intermediate die lip located on the most upstream side along the movement direction of the current collector,
wherein the intermediate plate top is a region of the intermediate die lip located on the most downstream side along the movement direction of the current collector, and
wherein the upper plate bottom is a region of the upper die lip located on the most upstream side along the movement direction of the current collector.

\* \* \* \* \*